United States Patent
Friedel et al.

(10) Patent No.: US 9,912,637 B2
(45) Date of Patent: Mar. 6, 2018

(54) USE OF PACKET HEADER EXTENSION FOR LAYER-3 DIRECT SERVER RETURN

(71) Applicant: A10 Networks, Incorporated, San Jose, CA (US)

(72) Inventors: Michael Friedel, Alexandria, WA (US); Hasnain Karampurwala, Santa Clara, CA (US)

(73) Assignee: A 10 NETWORKS, INCORPORATED, San Jose, CA (US)

( * ) Notice: Subject to any disclaimer, the term of this patent is extended or adjusted under 35 U.S.C. 154(b) by 284 days.

(21) Appl. No.: 14/502,808

(22) Filed: Sep. 30, 2014

(65) Prior Publication Data

US 2016/0094513 A1 Mar. 31, 2016

(51) Int. Cl.
*H04L 29/12* (2006.01)
*H04L 29/08* (2006.01)
*H04L 29/06* (2006.01)

(52) U.S. Cl.
CPC ...... *H04L 61/2503* (2013.01); *H04L 67/1002* (2013.01); *H04L 67/1008* (2013.01); *H04L 69/22* (2013.01); *H04L 61/6059* (2013.01)

(58) Field of Classification Search
CPC H04L 61/2503; H04L 67/1008; H04L 61/251
See application file for complete search history.

(56) References Cited

U.S. PATENT DOCUMENTS

| | | | | |
|---|---|---|---|---|
| 6,038,233 A * | 3/2000 | Hamamoto | ....... | H04L 29/12009 370/401 |
| 6,292,836 B1 * | 9/2001 | Teraoka | ....... | H04L 69/161 709/236 |
| 6,779,017 B1 * | 8/2004 | Lamberton | ....... | G06F 9/505 709/203 |
| 6,895,007 B1 * | 5/2005 | Teraoka | ....... | H04L 29/12216 370/352 |
| 7,107,359 B1 * | 9/2006 | Burton | ....... | H04L 49/602 370/463 |
| 7,457,626 B2 * | 11/2008 | Bahl | ....... | H04L 12/4633 370/328 |
| 7,650,427 B1 * | 1/2010 | Liu | ....... | G06Q 20/401 370/237 |
| 7,707,554 B1 * | 4/2010 | Kosche | ....... | G06F 11/34 712/227 |

(Continued)

OTHER PUBLICATIONS

Herbert, "Identifier-locator addressing for network virtualization", Mar. 14, 2016.*

*Primary Examiner* — Jerry Dennison (57) ABSTRACT

A method for performing Layer 3 direct server return is disclosed. The method comprises receiving an IP packet from a client device over a communication network. Further, the method comprises extracting a virtual IP address from a destination header field of the IP packet. Subsequently, the method comprises determining a server to which to forward the IP packet and inserting an IP address of the server in the destination header field of the IP packet. Next, the method comprises inserting the virtual IP address in an extension header for the IP packet. Finally, in one embodiment, the method comprises transmitting the IP packet to the server over the communication network.

15 Claims, 11 Drawing Sheets

Exemplary IPv6 Extension Header Data Field Format (56) References Cited

U.S. PATENT DOCUMENTS

| | | | | |
|---|---|---|---|---|
| 7,711,780 | B1* | 5/2010 | Durand | H04L 45/306 |
| | | | | 709/206 |
| 8,230,050 | B1* | 7/2012 | Brandwine | H04L 45/586 |
| | | | | 709/220 |
| 8,483,221 | B1* | 7/2013 | Vincent | H04L 61/1505 |
| | | | | 370/392 |
| 8,825,844 | B2* | 9/2014 | Bajamahal | H04L 41/0873 |
| | | | | 709/223 |
| 9,307,393 | B2* | 4/2016 | Hsu | H04L 61/2525 |
| 2004/0246991 | A1* | 12/2004 | Tsuzuki | H04L 29/12358 |
| | | | | 370/466 |
| 2006/0106943 | A1* | 5/2006 | Akisada | H04L 29/12358 |
| | | | | 709/245 |
| 2013/0227165 | A1* | 8/2013 | Liu | H04L 67/1027 |
| | | | | 709/238 |
| 2014/0010154 | A1* | 1/2014 | Hong | H04B 7/10 |
| | | | | 370/328 |
| 2014/0280810 | A1* | 9/2014 | Gabrielson | H04L 41/0806 |
| | | | | 709/222 |
| 2015/0067027 | A1* | 3/2015 | Liu | H04L 67/1027 |
| | | | | 709/203 |
| 2015/0215205 | A1* | 7/2015 | Sun | H04L 12/462 |
| | | | | 370/392 |
| 2016/0094513 | A1* | 3/2016 | Friedel | H04L 61/2503 |
| | | | | 709/245 |
| 2016/0094643 | A1* | 3/2016 | Jain | H04L 45/44 |
| | | | | 709/226 |

* cited by examiner

L3DSR Packet Flow

- Incoming:
  - Client Source IP: 144.100.10.1
  - Client Destination IP: 198.18.0.250
  - DSCP: 0x0 (explicitly cleared)

- LB to Server:
  - Source IP: 144.100.10.1
  - Destination IP: 74.80.1.1
  - DSCP: 0x4

- Server to Client:
  - Source IP: 198.18.0.250
  - Destination IP: 144.100.10.1

Exemplary IPv6 Extension Header Data Field Format

USE OF PACKET HEADER EXTENSION FOR LAYER-3 DIRECT SERVER RETURN

FIELD OF THE INVENTION

Embodiments according to the present invention relate generally to load balancing in a computer network and more particularly to direct server return load balancing in a computer network.

BACKGROUND OF THE INVENTION

Load balancers are typically used in a computer communication network to distribute traffic load across clustered CPUs and network infrastructure in order to increase network reliability and performance while introducing the benefits of redundancy. In traditional networks employing load balancers, incoming packets having requests from clients were assigned a Virtual IP ("VIP") on the load balancer itself and then the load balancer would pass the request to the appropriate server with negligible modification to the packets. The server would then respond to the load balancer with the required data, which would be relayed onto the client by the load balancer.

This type of network configuration, however, has a major drawback. Incoming requests are typically small, e.g., 20 Mbits, but their associated replies are typically up to ten times larger, e.g., 200 Mbits. As traffic needs to transit or pass through the load balancer on high traffic networks, the risk of the load balancer acting as a bottleneck rises considerably and network performance consequently suffers. Direct Server Return ("DSR") was introduced into the feature set of load balancers to address this drawback.

Figure 1:
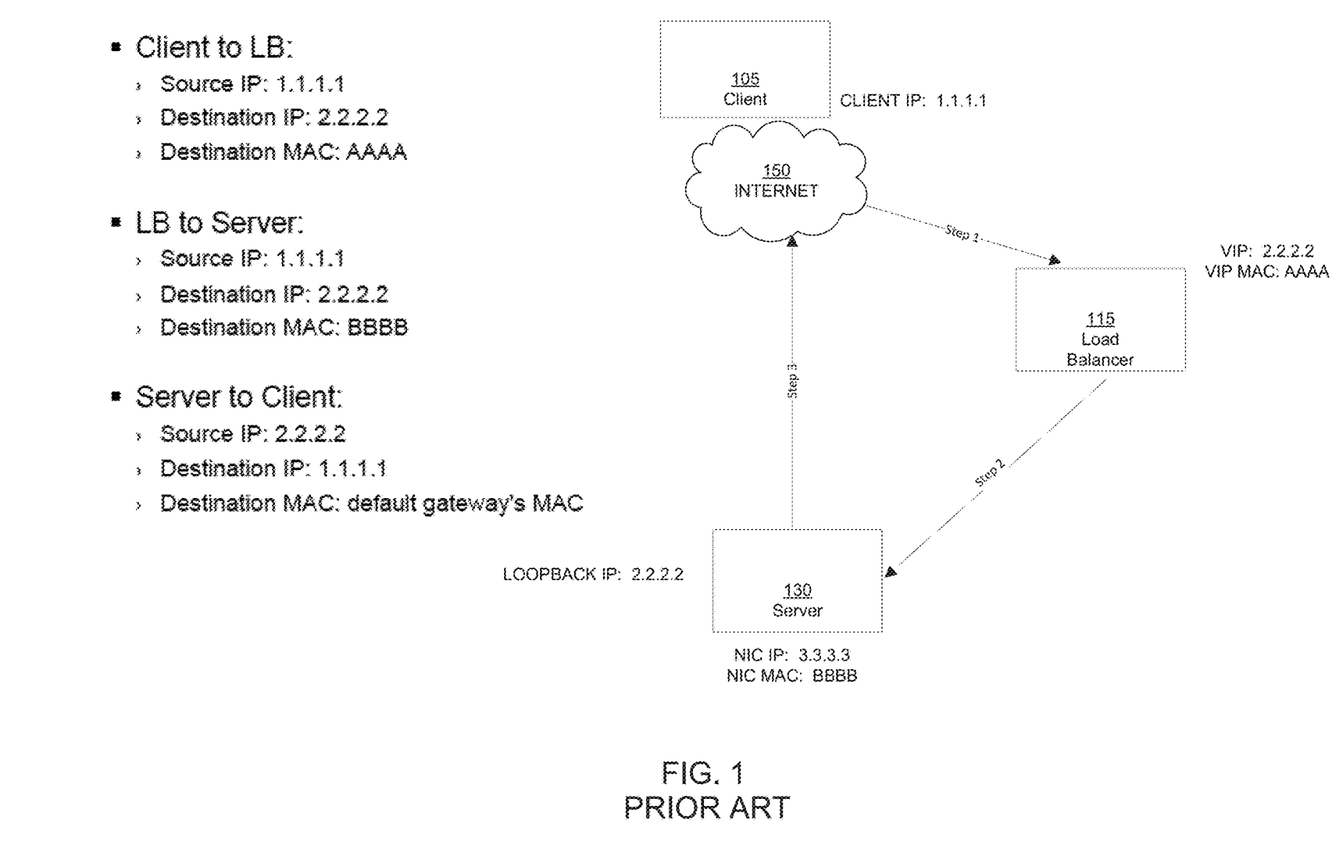
FIG. 1 illustrates a conventional network with a load balancer employing Layer-2 DSR ("L2DSR").

DSR modifies the traffic flow by permitting the server to respond directly to the client, thereby, relieving the network load balancer of the need to handle the heavy traffic load. FIG. 1 illustrates a conventional communication network with a load balancer employing Layer-2 DSR ("L2DSR"). With L2DSR, the client 105 with exemplary IP address 1.1.1.1 sends a request out through the Internet 150 to a VIP 2.2.2.2 served by load balancer 115. The load balancer 115 determines the real server destination (e.g. server 130) to forward the request to and also performs the MAC Address Translation ("MAT") necessary for this operation, e.g. translation of MAC address AAAA.AAAA.AAAA to the server's MAC address of BBBB.BBBB.BBBB. The source and destination IP addresses are preserved because the server 130 needs both addresses to be able to effectively communicate with the client directly. It needs the client's original IP address to know where to transmit the response data packets and it needs the client's original destination VIP to use as the loopback IP, so that the client 105 can recognize the source of the packets it receives from server 130. Using the VIP 2.2.2.2 as the loopback IP, the server 130 can then respond directly to client 105, thereby advantageously bypassing the load balancer 115.

One significant drawback of L2DSR is that because the load balancer 115 forwards incoming packets from the client 105 to the server by changing the destination MAC addresses of the incoming packets on the fly, both the load balancer 115 and the server 130 unfortunately need to be on the same L2 network segment. In other words, the network between the load balancer 115 and the server 130 is limited to being a Layer 2 network that needs to operate on MAC addresses at the Layer 2 level. Because the load balancer 115 and server 130 need to be on the same network segment, the networks that can be constructed using L2DSR are relatively constrained. The physical location of the servers is restricted and flexibility within the data center is greatly limited. This creates instability on very large networks, e.g., networks with more than 10 k hosts.

Figure 2:
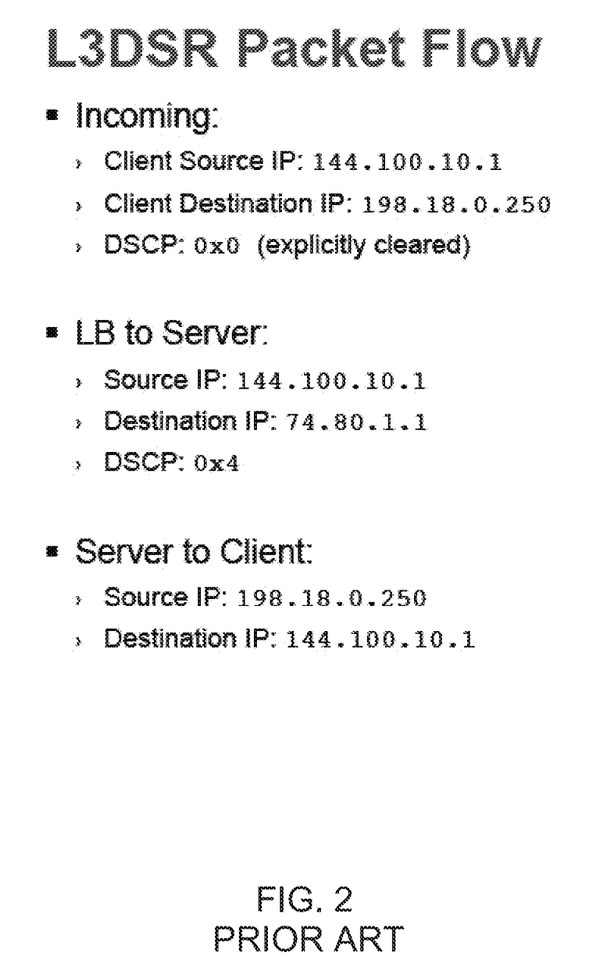
FIG. 2 illustrates an exemplary packet flow using L3DSR

Layer 3 DSR ("L3DSR") addresses the above stated constraints of networks using L2DSR. L3DSR dispenses with the requirement of performing a MAC Address Translation at the Layer 2 level. Instead, the load balancer sends the request received from the client to the server using a destination IP different from the VIP initially requested by the client. FIG. 2 illustrates an exemplary packet flow using L3DSR. As illustrated in FIG. 2, the load balancer changes the destination IP in the packets received from the client explicitly to reflect the server's real IP (74.80.1.1). However, the load balancer in an L3DSR network still needs to transmit (to the server) the source address of the client and also the original destination address requested by the client (the VIP address for which the request was made).

Figure 3:
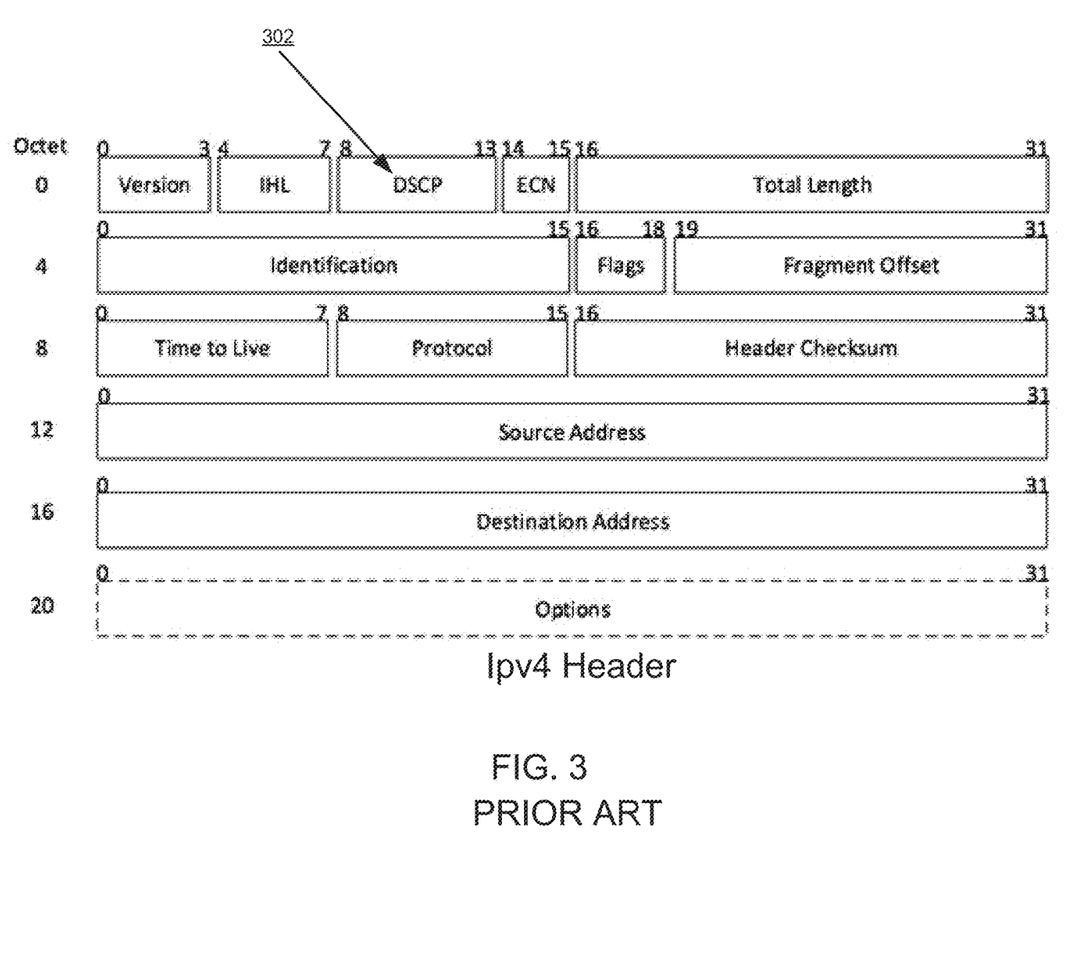
FIG. 3 illustrates the IPv4 header format.

FIG. 3 illustrates the IPv4 header format. L3DSR uses the Differentiated Services Code Point (DSCP) field 302 to communicate the VIP address for which the request was made to the server. The 6 bits in the DSCP field are used by the load balancer to encode the VIP address, typically, by performing a known mapping. The server then needs to derive the full VIP address from the information relayed by the load balancer by performing a look-up in a look-up table. For example, as shown in FIG. 2, the server uses the DSCP bits as set by the load balancer (0×4) to derive the IP address that it uses as the source IP (e.g. 198.18.0.250) to communicate with the client. In other words, once the server receives the packets from the load balancer, the server checks the DSCP bits and uses the mapping to determine the IP address which it will use to communicate back with the client. As with L2DSR, the VIP may be configured as the loopback IP and the server responds to the client using the client's original source IP as the new destination IP and the client's original destination IP (the VIP as determined by the mapping) as the new source IP.

While L3DSR improves on L2DSR by not requiring the server and the load balancer to be on the same network segment, it is also restrictive because it relies on, and thereby consumes, the DSCP field of an IPv4 header to communicate the destination VIP address. First, the DSCP field is a narrow field and, accordingly, only a limited number of mappings can be created. Second, use of the DSCP bits for L3DSR prevents them for being used for other purposes, e.g., to provide Quality of Service (QoS) information. Third, storage and computing resources are utilized on both the load balancer and server to encode and decode the DSCP bits. Lastly, all the servers and load balancers across the network need to keep track of the DSCP to VIP mappings and any updates need to be reflected across all devices to ensure consistency.

BRIEF SUMMARY OF THE INVENTION

Accordingly, a need exists for a method and apparatus that transmit a VIP address requested by a client from a load balancer to a server behind the VIP in an efficient and flexible manner within a network using L3DSR load balancing. Additionally, a need exists for transmitting the VIP address from the load balancer to the server using an extension header in an IPv6 packet so that none of the bits within the main IPv6 header itself need to be consumed for this purpose.

In one embodiment, a novel extension header in an IPv6 packet is used to transmit the VIP address from the load balancer to a server behind the VIP. Using an extension header to transmit the VIP address in a network supporting L3DSR load balancing is advantageous for several reasons. First, the IPv6 protocol supports multiple extension headers, which means that none of the bits in the IPv6 header itself need to be borrowed in order to relay the VIP address. Instead, a dedicated extension header can be used to transmit the address to the server.

Second, because the extension header is not limited to a narrow number of bits, no encoding or decoding of the VIP address is required. Instead, the entire decoded VIP can be sent in a dedicated extension header. This conserves computational resources on both the load balancer and server. Further, because the number of bits in an extension header is not limited, the range of VIP addresses is not restricted.

Third, using an extension header to transmit the VIP conserves computational and storage resources because no DSCP bits to VIP mappings need to be maintained or synchronized between the various hosts on the network.

In one embodiment, a method for performing Layer 3 direct server return is presented. The method comprises receiving an IP packet from a client device over a communication network. Further, the method comprises extracting a virtual IP address from a destination header field of the IP packet. Subsequently, the method comprises determining a server to which to forward the IP packet and inserting an IP address of the server in the destination header field of the IP packet. Next, the method comprises inserting the virtual IP address in an extension header for the IP packet. Finally, in one embodiment, the method comprises transmitting the IP packet to the server over the communication network.

In another embodiment, a computer-readable storage medium having stored thereon instructions that, if executed by a computer system cause the computer system to perform a method for performing Layer 3 direct server return is disclosed. The method comprises receiving an IP packet from a client device over a communication network. Further, the method comprises extracting a virtual IP address from a destination header field of the IP packet. Subsequently, the method comprises determining a server to which to forward the IP packet and inserting an IP address of the server in the destination header field of the IP packet. Next, the method comprises inserting the virtual IP address in an extension header for the IP packet. Finally, in one embodiment, the method comprises transmitting the IP packet to the server over the communication network.

In a different embodiment, an apparatus for performing packet communication is presented. The apparatus comprises a memory and a processor communicatively coupled to the memory, wherein the processor is configured to parse incoming IP requests from packets from client devices, and further wherein the processor is configured to: (a) receive an IP packet from the client device over the communication network; (b) extract a virtual IP address from a destination header field of the IP packet; (c) determine a server to forward the IP packet to and inserting an IP address of the server in the destination header field of the IP packet; and (d) insert the virtual IP address in an extension header for the IP packet. In one embodiment, the process can be further configured to transmit the IP packet to the server over the communication network.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "extracting," "inserting," "transmitting," "determining," or the like, refer to actions and processes (e.g., flowchart 1000 of FIG. 10) of a computer system or similar electronic computing device or processor (e.g., system 410 of FIG. 4). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 4:
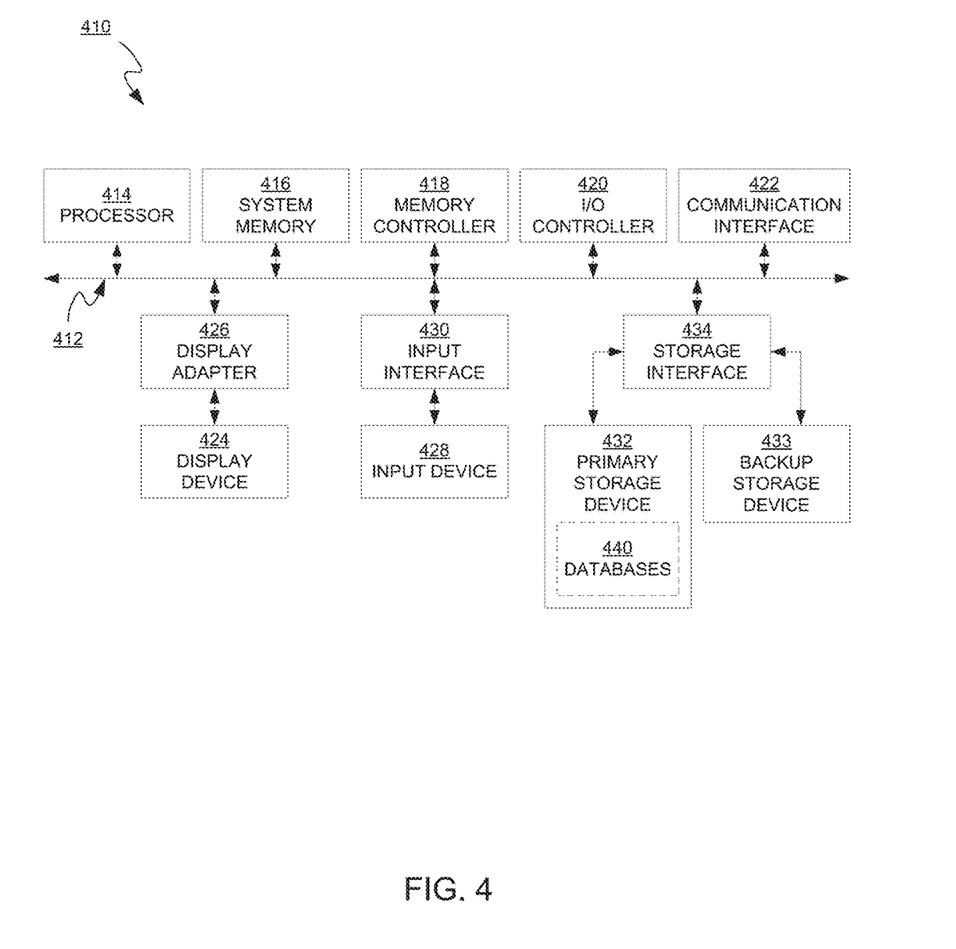
FIG. 4 is a block diagram of an example of a client-side computing system or a destination-side computing system, e.g., a server in accordance with embodiments of the present invention.

FIG. 4 is a block diagram of an example of a client-side computing system or a destination-side computing system, e.g., a server 410 in accordance with embodiments of the present invention. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 of an embodiment of the present invention and a system memory 416.

Processor 414 incorporates embodiments of the present invention and generally represents any type or form of processing unit capable of processing data or interpreting and executing instructions. In certain embodiments, processor 414 may receive instructions from a software application or module. These instructions may cause processor 414 to perform the functions of one or more of the example embodiments described and/or illustrated herein.

System memory 416 generally represents any type or form of volatile or non-volatile storage device or medium capable of storing data and/or other computer-readable instructions. Examples of system memory 416 include, without limitation, RAM, ROM, flash memory, or any other suitable memory device. Although not required, in certain embodiments computing system 410 may include both a volatile memory unit (such as, for example, system memory 416) and a non-volatile storage device (such as, for example, primary storage device 432).

Computing system 410 may also include one or more components or elements in addition to processor 414 and system memory 416. For example, in the embodiment of FIG. 4, computing system 410 includes a memory controller 418, an input/output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between example computing system 410 and one or more additional devices. For example, communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In one embodiment, communication interface 422 provides a direct connection to a remote server via a direct link to a network, such as the Internet. Communication interface 422 may also indirectly provide such a connection through any other suitable connection.

Communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data for display on display device 424.

As illustrated in FIG. 4, computing system 410 may also include at least one input device 428 coupled to communication infrastructure 412 via an input interface 430. Input device 428 generally represents any type or form of input device capable of providing input, either computer- or human-generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In one example, databases 440 may be stored in primary storage device 432. Databases 440 may represent portions of a single database or computing device or it may represent multiple databases or computing devices. For example, databases 440 may represent (be stored on) a portion of computing system 410. Alternatively, databases 440 may represent (be stored on) one or more physically separate devices capable of being accessed by a computing device, such as computing system 410.

Continuing with reference to FIG. 4, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be separate devices accessed through other interface systems.

Many other devices or subsystems may be connected to computing system 410. Conversely, all of the components and devices illustrated in FIG. 4 need not be present to practice the embodiments described herein. The devices and subsystems referenced above may also be interconnected in different ways from that shown in FIG. 4. Computing system 410 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of the example embodiments described and/or illustrated herein. Additionally or alternatively, the example embodiments described and/or illustrated herein may be implemented in firmware and/or hardware.

Figure 5:
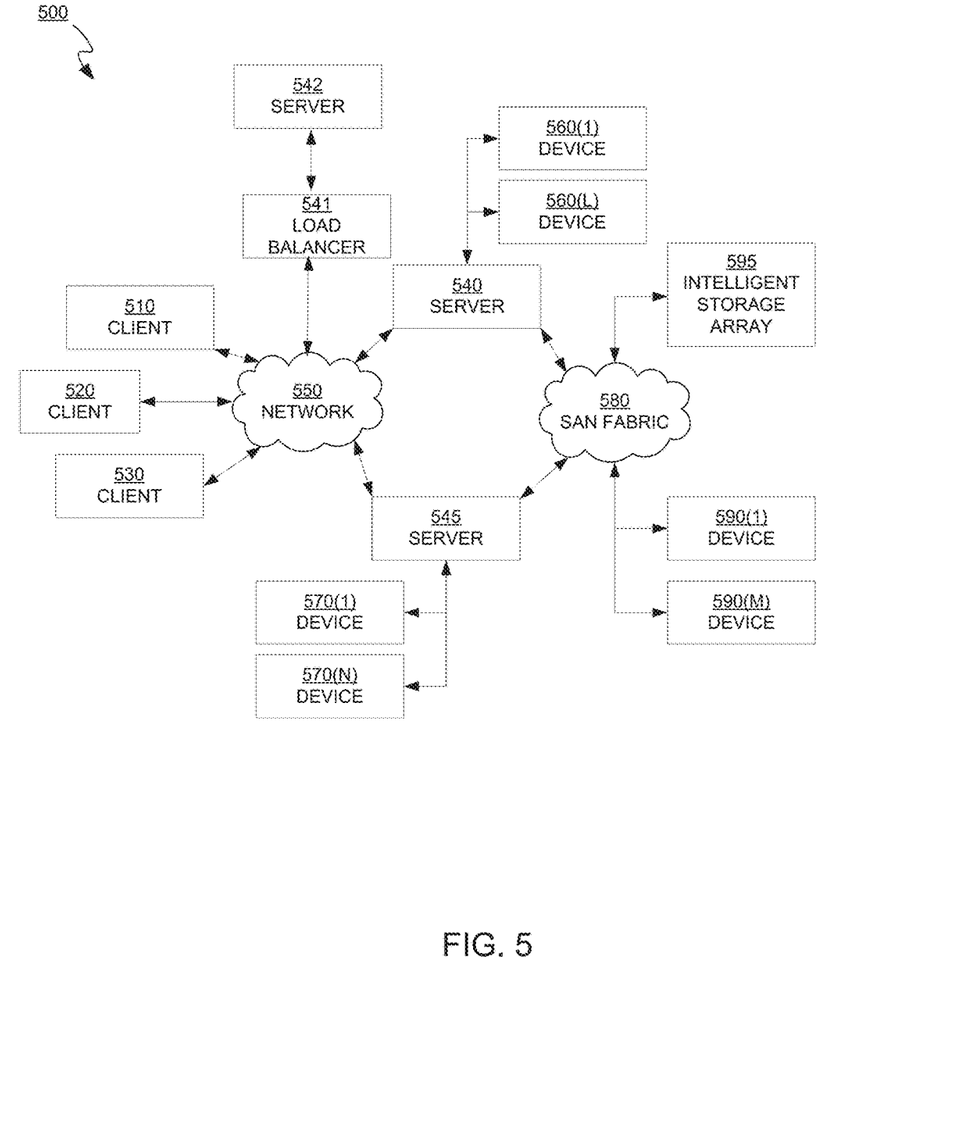
FIG. 5 is a block diagram of an example of a network architecture in which servers and client systems may be coupled to a network, according to embodiments of the present invention.

FIG. 5 is a block diagram of an example of a network architecture 500 in which client systems 510, 520, and 530 and servers 540, 542, and 545 may be coupled to a network 550. Client systems 510, 520, and 530 generally represent any type or form of computing device or system, such as computing system 410 of FIG. 4.

Similarly, servers 540, 542 and 545 generally represent computing devices or systems, such as application servers or database servers, configured to provide various database services and/or run certain software applications. A server, for example, server 542, may connect to network 500 through a load balancer 541. Network 550 generally represents any telecommunication or computer network including, for example, an intranet, a wide area network (WAN), a local area network (LAN), a personal area network (PAN), or the Internet.

With reference to computing system 410 of FIG. 4, a communication interface, such as communication interface 422, may be used to provide connectivity between each client system 510, 520, and 530 and network 550. Client systems 510, 520, and 530 may be able to access information on server 540, 542 or 545 using, for example, a Web browser or other client software. Such software may allow client systems 510, 520, and 530 to access data hosted by server 540, 542, server 545, storage devices 560(1)-(L), storage devices 570(1)-(N), storage devices 590(1)-(M), or intelligent storage array 595.

In one embodiment, all or a portion of one or more of the example embodiments disclosed herein are encoded as a computer program and loaded onto and executed by a switch device connected between servers 540, 542 or 545 and client systems 510, 520, and 530.

Use of Packet Header Extension for Layer-3 Direct Server Return

In one embodiment, the present invention provides a method and apparatus that transmit a VIP address requested by a client from a load balancer (using L3DSR load balancing) to a server behind the VIP in an efficient and flexible manner. Additionally, in one embodiment, the present invention provides a method for transmitting the VIP address from the load balancer to the server using an extension header in an IPv6 packet so that none of the bits within the main IPv6 header itself need to be consumed for this purpose.

In one embodiment, an extension header in an IPv6 packet is used to advantageously transmit the VIP address from the load balancer to a server behind the VIP. Using an extension header to transmit the VIP address in a network supporting L3DSR load balancing is advantageous for several reasons. First, the IPv6 protocol supports multiple extension headers, which means that none of the bits in the IPv6 header itself need to be consumed in order to relay the VIP address. As discussed above, one of the drawbacks of using IPv4 packets is that the DSCP field, which would otherwise be used for QoS information, would instead need to provide encoded VIP information. Embodiments of the present invention allow a dedicated extension header in an IPv6 packet to be used to transmit the address to the server. Accordingly, none of the fields in the main IPv6 header need to be usurped to relay the VIP. Further, the DSCP/Traffic Class field can be used for its original purpose, which was to convey QoS related information.

Second, because the extension header is not limited to a narrow number of bits, no encoding or decoding of the VIP address is required. Further, a dedicated look-up agent may not be required to run on all the load balancers and server that performs the mapping. Instead, the entire VIP can be sent in a dedicated extension header. This conserves computational resources on both the load balancer and server. Also, the load balancer and server do not need to store the mappings, which conserves storage resources.

Third, because the number of bits in an extension header is not limited, the range of VIP addresses is not restricted. Previously only 6 bits were available in the DSCP field of an IPv4 packet and, therefore, the range of addresses that could be encoded in the DSCP field were limited. The bits in an extension header of an IPv6 packet are not similarly limited and, accordingly, a much wider range of VIP addresses can be relayed.

Finally, using an extension header to transmit the VIP conserves computational and storage resources on the load balancers and the servers because no DSCP bits to VIP mappings need to be maintained or synced between the various hosts on the network.

Figure 6:
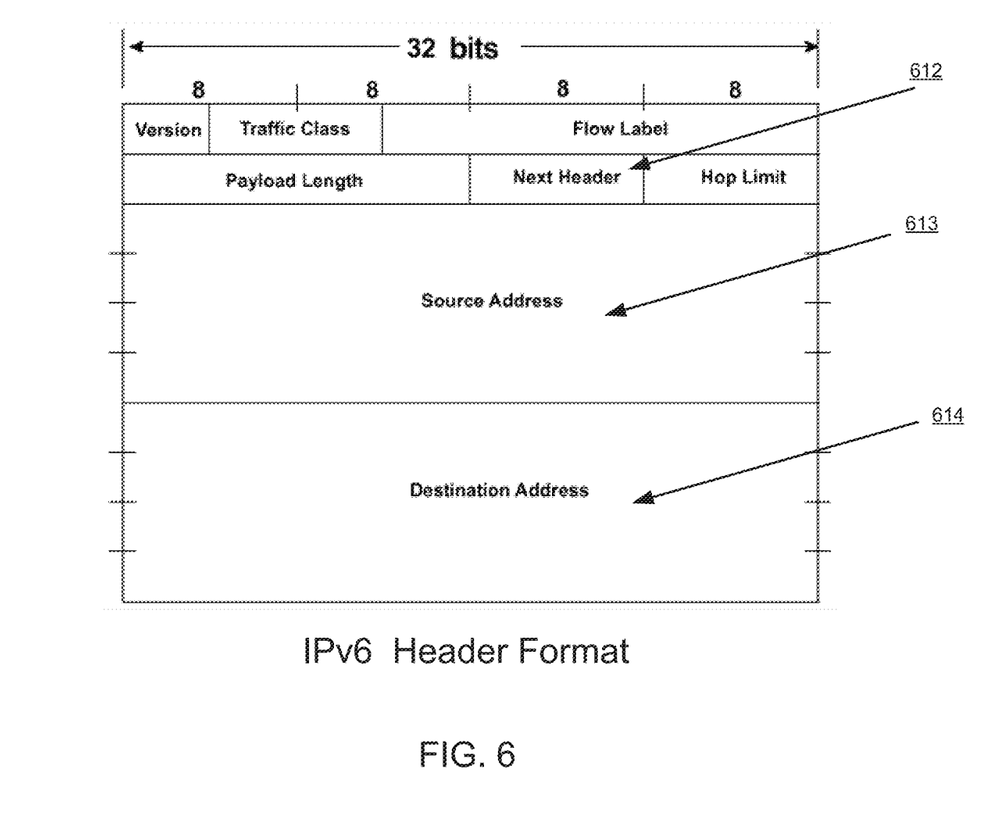
FIG. 6 is an illustration of the IPv6 header format.

FIG. 6 is an illustration of the IPv6 header format. The IPv6 header comprises a source address field 613 and a destination address field 614. It also comprises a "Next Header" field 612, which is an 8-bit selector field to identify the type of header immediately following the IPv6 header.

Figure 7:
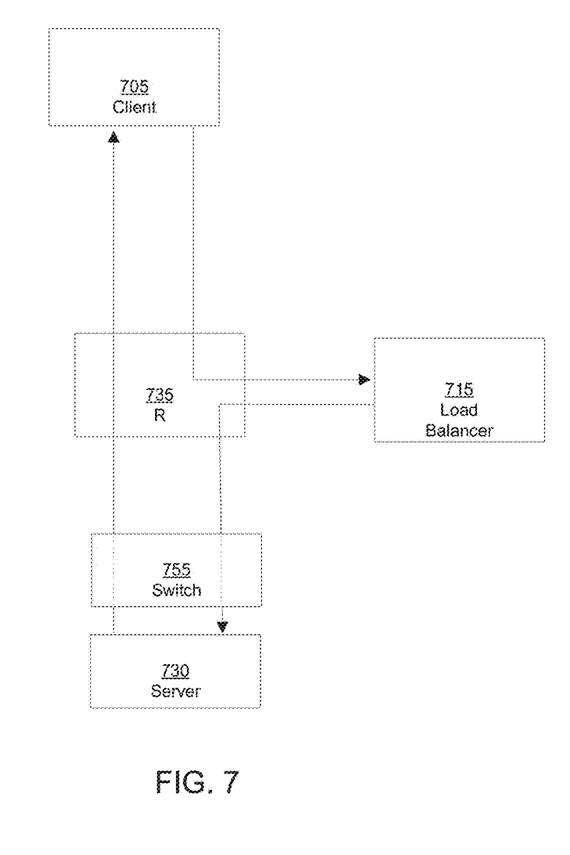
FIG. 7 illustrates an exemplary configuration of a network using L3DSR load balancing and IPv6 extension headers to communicate VIP addresses in accordance with an embodiment of the invention.

FIG. 7 illustrates an exemplary configuration of a network using L3DSR load balancing and IPv6 extension headers to communicate VIP addresses in accordance with an embodiment of the invention. When the client 705 sends in a request through router 735 to the load balancer 715, the transmitted packets contain the client's source address in field 613 and the destination VIP address in the field 614. In L3DSR, as explained above, the load balancer 715 replaces the VIP address in the destination field 614 of the IPv6 packets with the real IP address for server 730. Because the server still needs the VIP address initially requested by the client 705 to use as the loopback IP, the VIP address is relayed to the server 730 in a custom extension header for the IPv6 packet in accordance with the present invention. The load balancer or device providing the L3-DSR services is configured to insert the extension header to the IPv6 packet and add the VIP information in the extension header.

When the server 730 receives the IPv6 packet with the VIP address in an extension header, it replaces the IP address in the destination address field 614 with the VIP address conveyed in the extension header and uses it as the loopback IP. Subsequently, it recalculates checksums as necessary to ensure error-free transmission.

The Next Header field 612 (FIG. 6) can be used to indicate that the extension header following the main IPv6 header comprises VIP address information. As mentioned above, conveying the VIP address in an extension header instead of using the DSCP field as was done previously is advantageous because it makes L3DSR scalable and allows the DSCP bits to be used for their original purpose.

Figure 8:
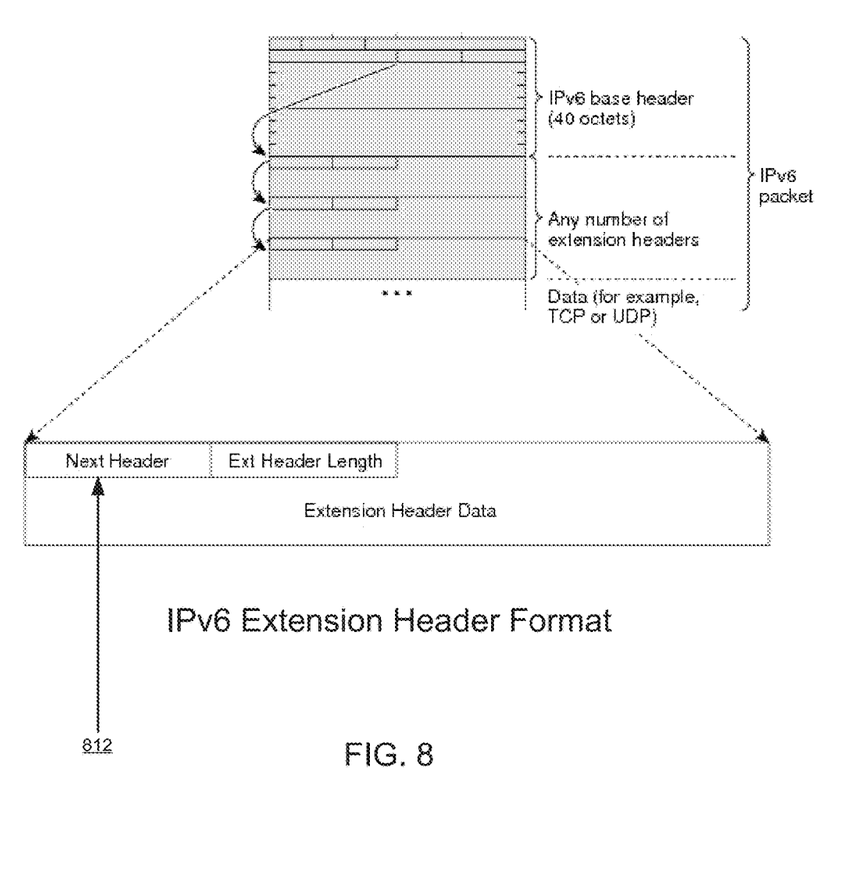
FIG. 8 illustrates the IPv6 extension header format.

FIG. 8 illustrates the IPv6 extension header format. As illustrated in FIG. 8, an IPv6 packet can have zero, one or more extension headers, each identified by the Next Header field 812 of the preceding header. In one embodiment of the present invention, one of the extension headers is used to convey the VIP address from the load balancer 715 to the server 730. The Next Header field 812 in a preceding extension header (or the Next Header field 612 in the main header) is used to encode a prefix code to indicate that the next header comprises a VIP address, e.g., using "L3D" or "222" (the actual number may need to be assigned by LANA) as a prefix code.

Figure 9:
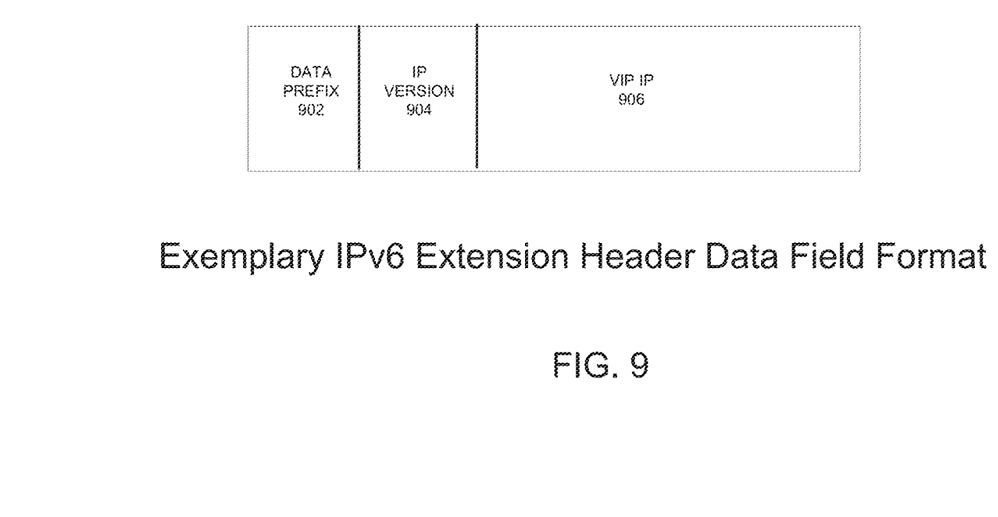
FIG. 9 illustrates an exemplary format for an IPv6 extension header data field in accordance with an embodiment of the present invention.

FIG. 9 illustrates an exemplary format for an IPv6 extension header data field in accordance with an embodiment of the present invention. For example, in one embodiment, the header data can contain a 3 byte data prefix field 902 indicating the type of data transmitted in the data field, e.g., "L3D" or "VIP." It can also contain a 1 byte data field 904 indicating the IP version of the packets transmitted by the client, e.g., IPv4 and IPv6. If the packet is an IPv4 packet, then a 4 byte data field is required for the VIP IP. On the other hand, if the packet is an IPv6 packet, a 16 byte data field is required for the VIP IP. Because the VIP IP can be communicated in its entirety, a mapping does not need to be maintained and updated across all the load balancers and servers in the network. Further, the server does not need to execute an agent to perform a mapping between a narrower DSCP field and the VIP as in the prior art. Accordingly, embodiments of the present invention advantageously conserve computational and storage resources across the network. In one embodiment, however, the VIP can be encoded within the extension header as well.

In one embodiment, a router or switch 755 between the load balancer 715 and server 730, instead of the server 730, can be configured to replace the server's destination address in field 614 with the VIP address for packets being transmitted from the load balancer 715 to the server 730. In other words, because no complex mapping is involved, the logic to replace the destination address in the header field 614 with the VIP address can be encoded in the hardware of devices such as routers and switches (e.g., the last-hop between the load balancer 715 and server 730). This reduces computational overhead on the server 730 itself.

Instead of the server 730, router or switch 755 can replace the L3 destination IP address with the VIP contained in the extension header and recalculate checksums as necessary. Another advantage of this is that while the network between the load balancer and 715 and switch 755 can be an L3 network, the network between the last-hop (e.g. switch 755) and the server 730 can be a traditional L2 network. In this way, advantages of both an L2 and L3 network can be preserved. The server and load balancer do not need to be on the same network segment as in traditional L2 networks and the network can, therefore, be extended and scaled. Further, the server 730 does not need to be configured to replace the destination IP in the packets with the VIP because the router or switch 755 can perform that function ahead of time. Accordingly, the server may benefit from having reduced additional overhead.

As discussed above, both IPv4 and IPv6 (4 bytes or 16 bytes) VIP addresses can be transmitted in the extension header. In one embodiment, the packets transmitted from the clients 705 may be IPv4 packets. In this embodiment, if server 730 is configured only to process IPv6 packets, the load balancer would convert the incoming packets from the clients to IPv6 by performing protocol translation and switching the headers on the packets. The load balancer would also, for example, ensure that the 4 byte IPv4 VIP address requested by the client is added to the extension header of the IPv6 packet before transmitting it to the server 730.

In a different embodiment, however, if the server is configured to only process IPv4 packets and maintain only a single stack, then the last-hop router or switch 755 can be configured to convert the IPv6 packets from the load balancer 715 to IPv4 packets before they reach server 730. In other words, the last-hop router or switch can be configured to extract the VIP from the header in the incoming IPv6 packet and create an IPv4 packet with the VIP as the destination address. In this way an IPv6 network can be maintained all the way till the last-hop before the server. Plus, the server only needs to maintain a single stack instead of being configured to handle both IPv6 and IPv4 type packets.

Figure 10:
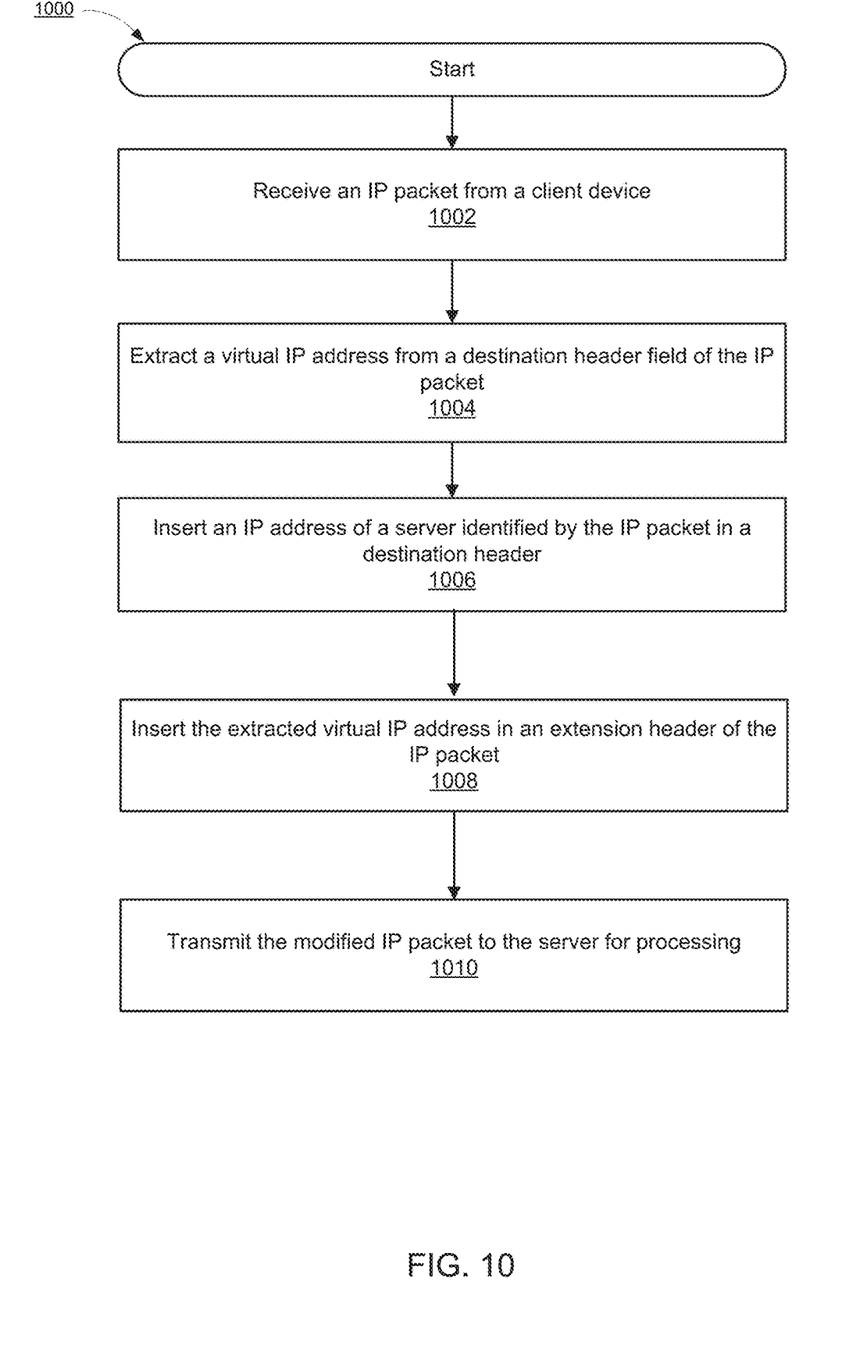
FIG. 10 depicts a flowchart for an exemplary computer controlled process for performing Layer 3 direct server return in accordance with embodiments of the present invention.

FIG. 10 depicts a flowchart for an exemplary computer controlled process for performing Layer 3 direct server return in accordance with embodiments of the present invention.

At step 1002, an IP packet is received from a client device, e.g., client 705 in FIG. 7, by a load balancer.

At step 1004, the load balancer 715 extracts a VIP from the destination header field of the IP packet and at step 1006, the load balancer inserts the real IP address of a server 730 that the client device is trying to communicate with. The load balancer determines the real server to which it needs to forward the request.

Further, at step 1008, the load balancer also inserts the original VIP address in an extension header field of the IP packet.

Finally, at step 1010, the load balancer transmits the modified IP packet with the additional extension header field to the server.

Figure 11:
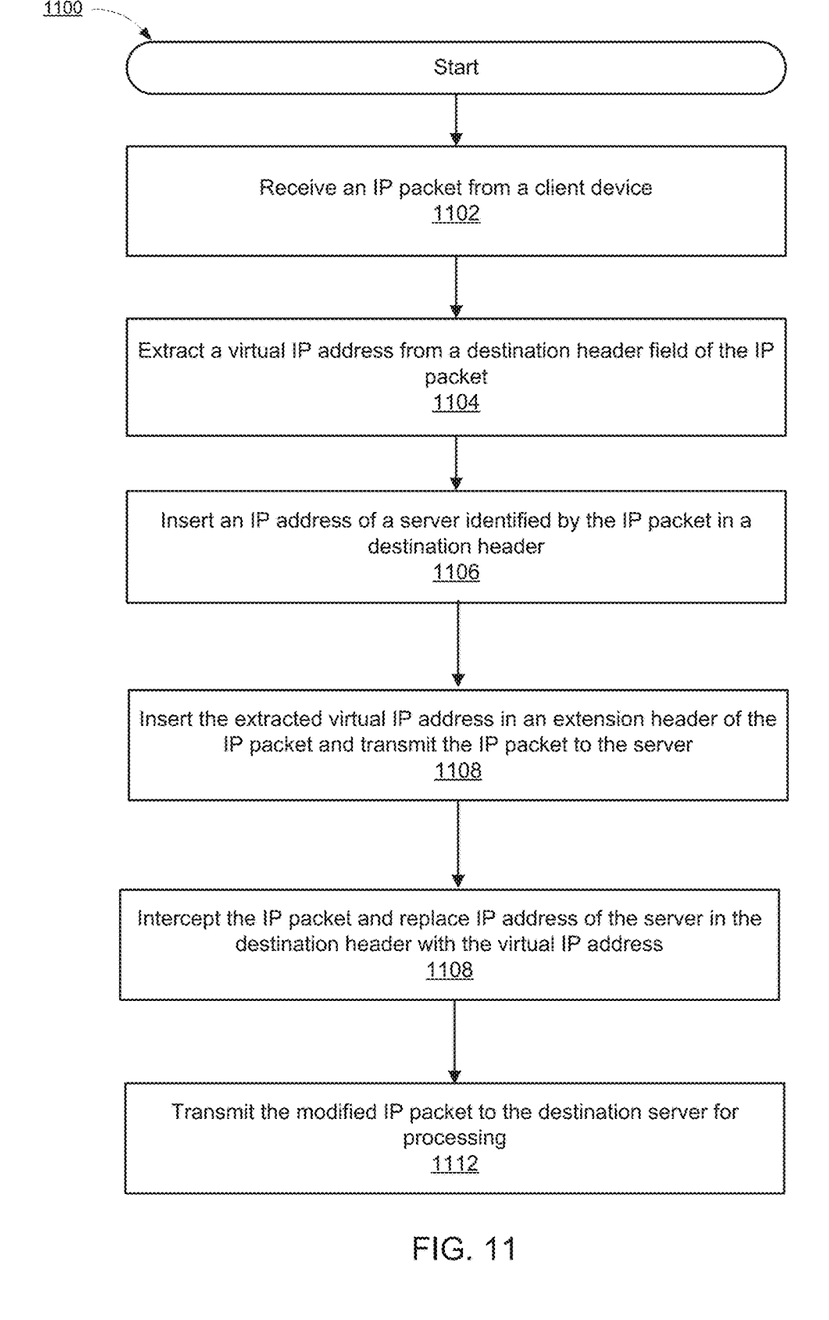
FIG. 11 depicts a flowchart for an exemplary computer controlled process for using a last-hop device in performing Layer 3 direct server return in accordance with an embodiment of the present invention.

FIG. 11 depicts a flowchart for an exemplary computer controlled process for using a last-hop device in performing Layer 3 direct server return in accordance with an embodiment of the present invention.

At step 1102, an IP packet is received from a client device, e.g., client 705 in FIG. 7, by a load balancer.

At step 1104, the load balancer 715 extracts a VIP from the destination header field of the IP packet and at step 1106, the load balancer inserts the real IP address of a server 730 that the client device is trying to communicate with. The load balancer determines the real server to which it needs to forward the request.

Further, at step 1108, the load balancer also inserts the original VIP address in an extension header field of the IP packet and transmits the IP packet to the destination server.

At step 1110, a router or switch 755 between the load balancer 715 and server 730 intercepts the packet and can be configured to replace the server's destination address in field 614 with the VIP address for the packets being transmitted from the load balancer 715 to the server 730.

Finally, at step 1112, the router or switch 755 transmits the modified IP packet to the destination service on the same L2 network, e.g., server 730.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for communicating packets in a communication network, said method comprising:
receiving an IP packet from a client device over said communication network;
extracting a virtual IP address from a destination header field of said IP packet;
determining a server to which to forward said IP packet and inserting an IP address of said server in said destination header field of said IP packet;

inserting said virtual IP address in an extension header for said IP packet, wherein the extension header is a custom header appended to a main header of said IP packet; and transmitting said IP packet to said server over said communication network.

2. The method of claim 1, further comprising:
transmitting said IP packet to a routing device, wherein said routing device is operable to:
replace said IP address of said server in said destination header field of said IP packet with said virtual IP address; and
transmit said IP packet to said server over said communication network.

3. The method of claim 2, wherein said communication network between said routing device and said server is a Layer 2 compliant network.

4. The method of claim 1, further comprising:
responsive to a determination that said IP packet is an IPv4 packet, performing a protocol translation to convert said IP packet to an IPv6 packet format prior to said inserting.

5. The method of claim 4, wherein said virtual IP address is selected from the group consisting of: an IPv4 address and an IPv6 address.

6. The method of claim 1, wherein said inserting further comprises:
adding a prefix code identifying said virtual IP address in said extension header.

7. The method of claim 6, wherein said inserting further comprises:
adding a data field to said extension header identifying an IP version of said IP packet.

8. A non-transitory computer-readable storage medium having stored thereon instructions that, if executed by a computer system cause the computer system to perform a method for performing Layer 3 direct server return, said method comprising:
receiving an IP packet from a client device over a communication network;
extracting a virtual IP address from a destination header field of said IP packet;
determining a server to which to forward said IP packet and inserting an IP address of said server in said destination header field of said IP packet;
inserting said virtual IP address in an extension header for said IP packet wherein the extension header is a custom header appended to a main header of said IP packet; and
transmitting said IP packet to said server over said communication network.

9. The computer-readable medium as described in claim 8, wherein said method further comprises:
transmitting said IP packet to a routing device, wherein said routing device is operable to:
replace said IP address of said server in said destination header field of said IP packet with said virtual IP address; and
transmit said IP packet to said server.

10. The computer-readable medium as described in claim 9, wherein a communication network between said routing device and said server is a Layer 2 compliant network.

11. The computer-readable medium as described in claim 8, wherein said method further comprises:
responsive to a determination that said IP packet is an IPv4 packet, performing a protocol translation to convert said IP packet to an IPv6 packet format.

12. The computer-readable medium as described in claim 11, wherein said virtual IP address is an IPv4 address.

13. The computer-readable medium as described claim 8, wherein said inserting further comprises:
adding a prefix code identifying said virtual IP address in said extension header.

14. The computer-readable medium as described in 13, wherein said inserting further comprises:
adding a data field to said extension header identifying an IP version of said IP packet.

15. An apparatus for performing packet communication, said apparatus comprising:
a memory;
a processor communicatively coupled to said memory, wherein said processor is configured to parse incoming IP requests from packets from client devices, and further wherein said processor is configured to:
receive an IP packet from said client device over said communication network;
extract a virtual IP address from a destination header field of said IP packet;
determine a server to forward said IP packet to and inserting an IP address of said server in said destination header field of said IP packet; and
insert said virtual IP address in an extension header for said IP packet wherein the extension header is a custom header appended to a main header of said IP packet. packet; and
transmit said IP packet to said server over said communication network.

* * * * *